(12) United States Patent
Allen et al.

(10) Patent No.: US 8,585,221 B2
(45) Date of Patent: Nov. 19, 2013

(54) BI-DIRECTIONAL BLIND SIGHT ILLUMINATION AND DEFLECTOR DEVICE

(76) Inventors: Dann M Allen, Hartford City, IN (US); Richard Allen, Hartford City, IN (US)

(*) Notice: Subject to any disclaimer, the term of this patent is extended or adjusted under 35 U.S.C. 154(b) by 118 days.

(21) Appl. No.: 13/287,782

(22) Filed: Nov. 2, 2011

(65) Prior Publication Data

US 2012/0105959 A1    May 3, 2012

Related U.S. Application Data

(60) Provisional application No. 61/409,951, filed on Nov. 3, 2010.

(51) Int. Cl.
*G02B 5/12*    (2006.01)

(52) U.S. Cl.
USPC .................................................. 359/528

(58) Field of Classification Search
USPC ............................ 359/528, 529–532
See application file for complete search history.

(56) References Cited

U.S. PATENT DOCUMENTS

| | | | |
|---|---|---|---|
| 27,855 | A | 4/1860 | Wyberd |
| 1,655,891 | A | 1/1928 | Boots et al. |
| 2,142,803 | A | 1/1939 | Robertson |
| 3,963,307 | A | 6/1976 | Kirk |
| 4,000,882 | A | 1/1977 | Penton |
| 6,168,276 | B1 | 1/2001 | Weid |
| 7,300,165 | B2 | 11/2007 | Garcia |
| 2006/0162644 | A1* | 7/2006 | Choi .............................. 116/200 |

* cited by examiner

*Primary Examiner* — Euncha Cherry
(74) *Attorney, Agent, or Firm* — J D Ritchison

(57) ABSTRACT

An optical device that reflects back some of the same light that been projected towards the reflector with more intensity when transmitting through the reflector such that the remaining light is dispersed and still can been seen. The light is concentrated and projected forward by the device such that the appearance of the intensified light may act as a warning of oncoming vehicles, emergency situations, stopped vehicles and pedestrians on a hill or curve where line of sight is inhibited. The device is comprised of at least one reflective, dispersive and transmitting lens having a front and a rear surface and side edges; a frame that encircles the transmitting lens; a pole for affixing and placing the transmitting lens and frame to the ground; and a means to secure the frame of the transmitting lens to the pole.

16 Claims, 9 Drawing Sheets

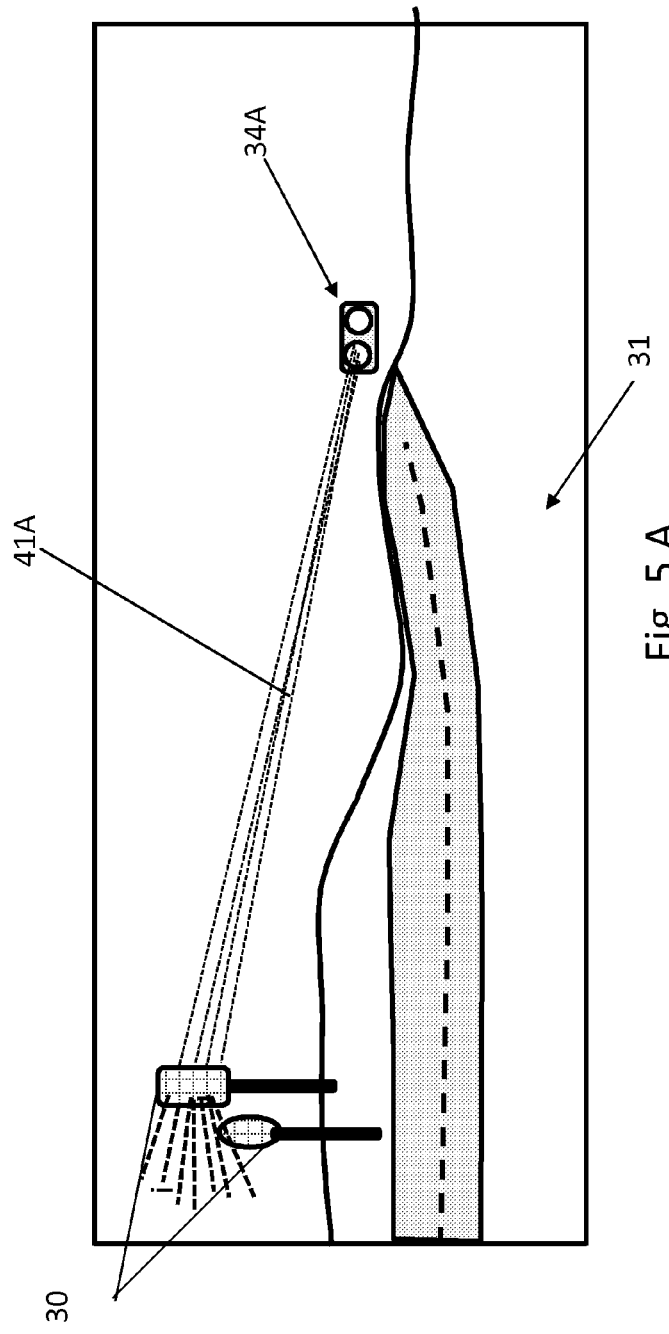
Fig. 5 A
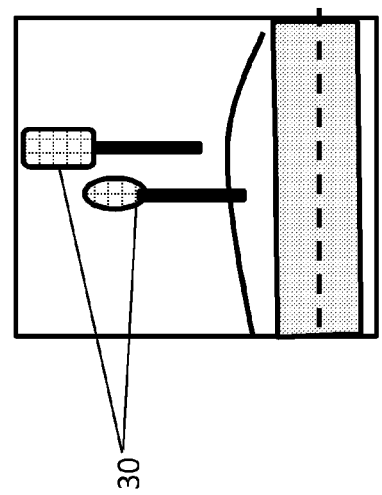
Fig. 5 B
FIG. 5

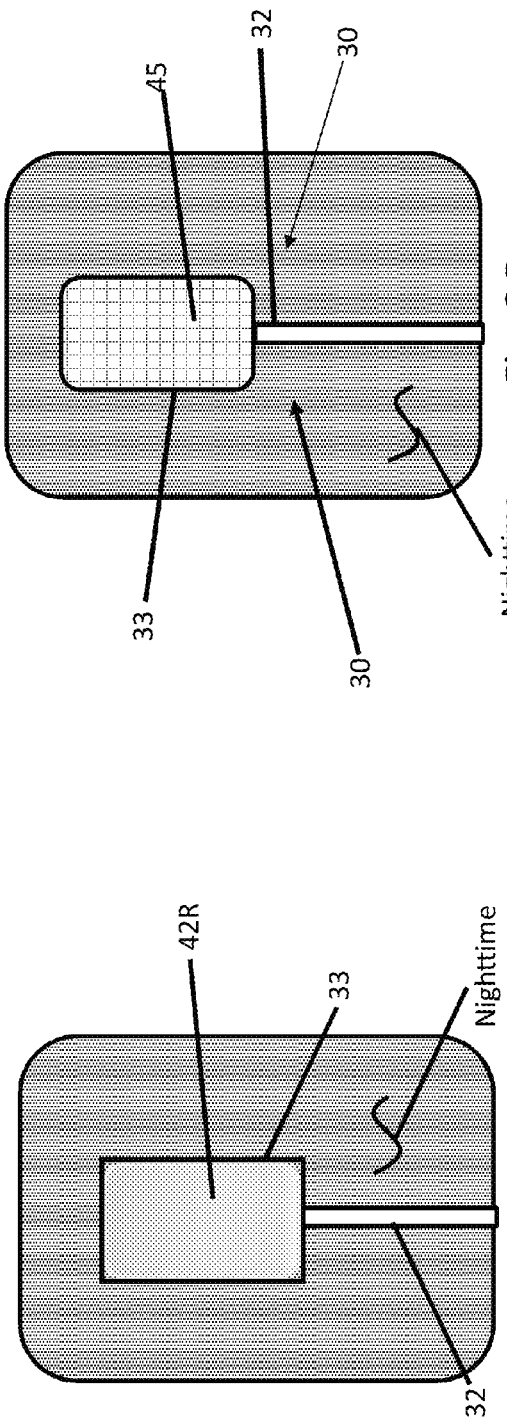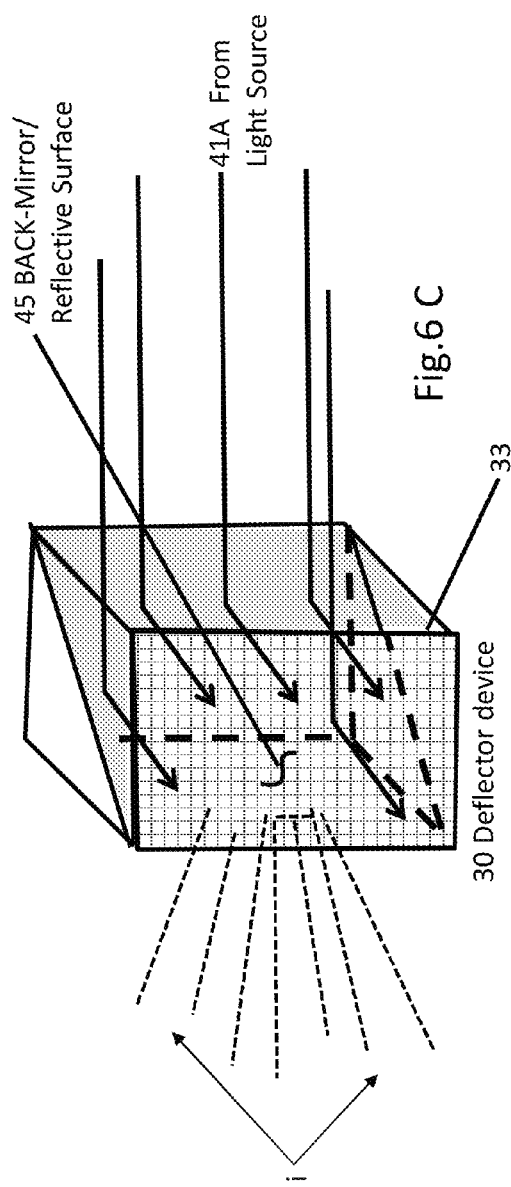
FIG. 6

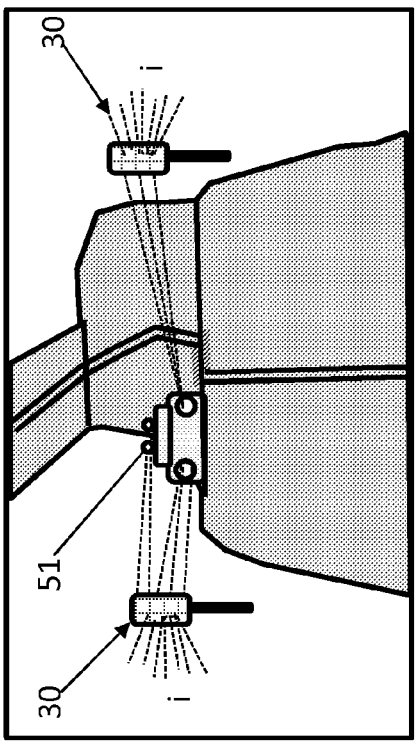
Fig. 8 A
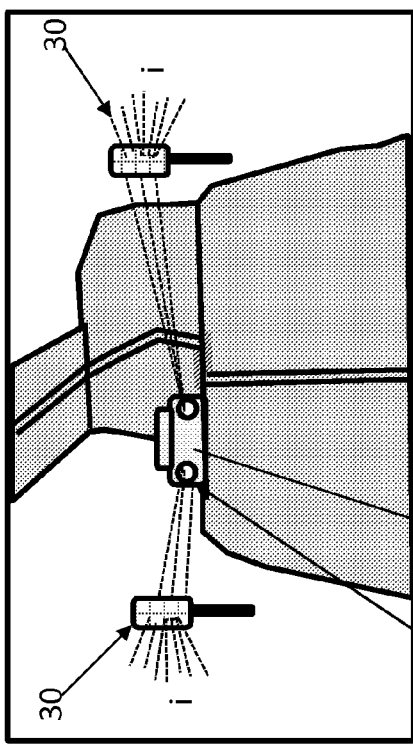
Fig. 8 B
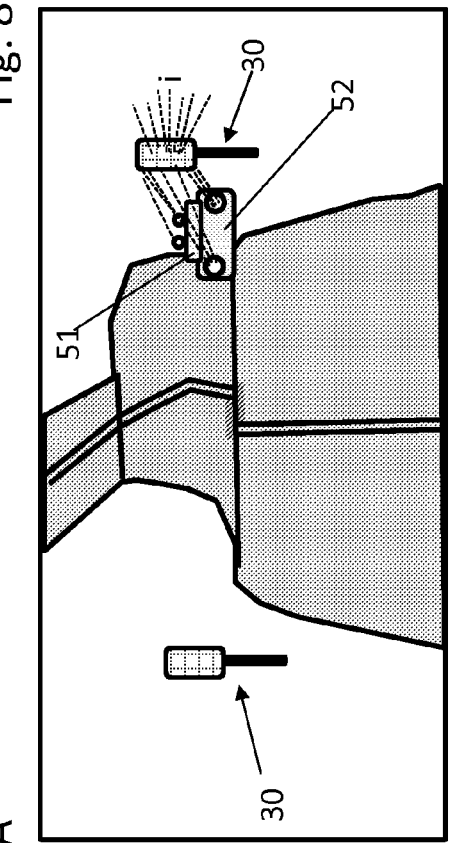
Fig. 8 C
FIG. 8

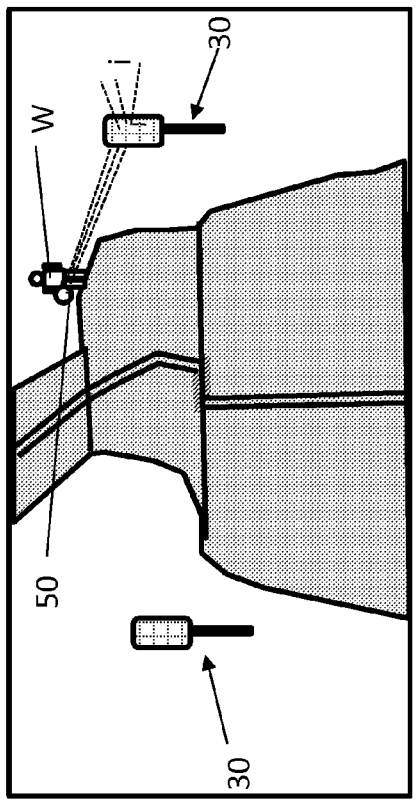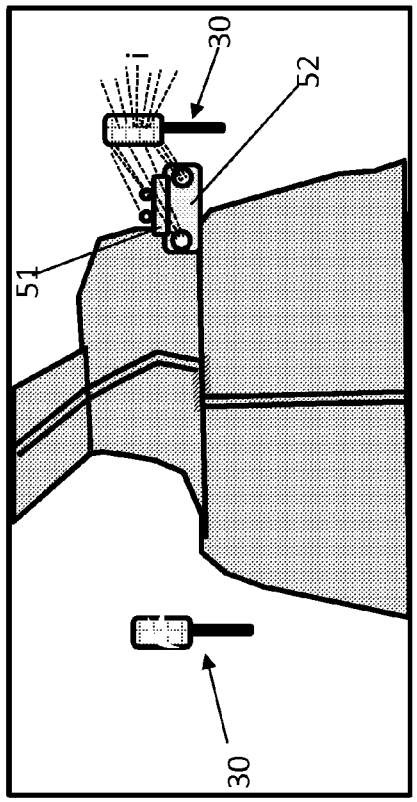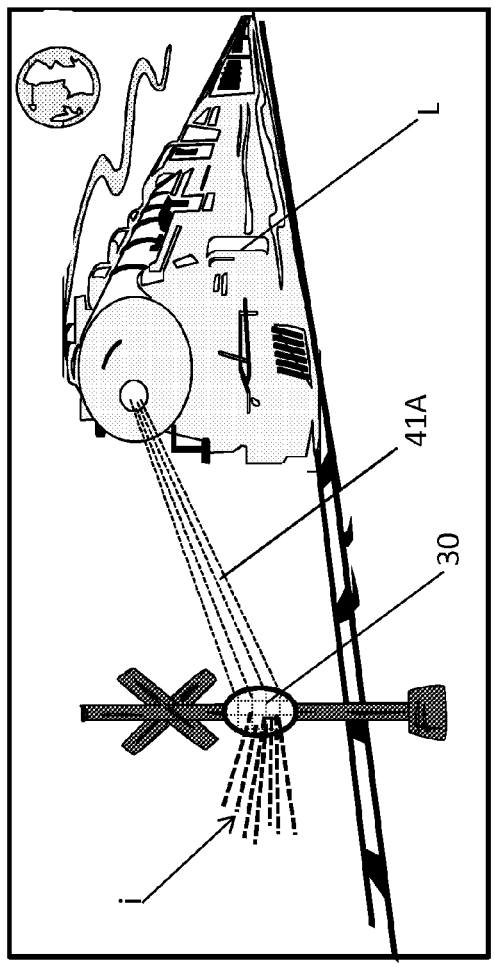
FIG. 9

BI-DIRECTIONAL BLIND SIGHT ILLUMINATION AND DEFLECTOR DEVICE

CROSS-REFERENCE TO RELATED APPLICATIONS

This application claims the benefit of Provisional Patent Application Ser. No. 61/409,951 filed Nov. 3, 2010 by Dann Allen et al and entitled "Bi-directional Blind Sight Illumination and Deflector Device".

FIELD OF INVENTION

This invention relates to a Bi-directional Blind Sight Illumination and Deflector Device. Particularly this reflector product is related to reflectors and optical devices that reflect back some of the same light that been projected towards the reflector with more intensity when transmitting/cutting through the reflector so that the remaining light still being projected through the reflector can been seen. All reflectors have a reflective surface in or behind a lens or a prism that deflects the light back towards the light source.

The Blind Sight device works somewhat similar to the refracting reflector way but uses light from the backside.

This means that light that comes from the backside of the reflector is concentrated and projected forwards instead of reflecting backwards and returning toward the light source. All light hitting/impacting the front side does not reflect back, rather it is intensified and dispersed. This allows any light from the backside to be seen on the front of the reflector. The intensified light may be seen even if equal or greater light is being projected onto the front side of the reflector simultaneously from another light source. Hence the intensified light may act as a warning/attention device.

FEDERALLY SPONSORED RESEARCH

None.

SEQUENCE LISTING OR PROGRAM

None.

BACKGROUND—FIELD OF INVENTION and PRIOR ART

A. Introduction to Problem Addressed:

The large mileage of roadways and highways throughout the United States and other countries is well known. Most are without lighting or power to light the sides of the pavement or gravel. While this may be safe for straight and flat terrain, it does not provide a safe condition for hilly, mountainous, curvy or highly vegetated environments. The Bi-directional Blind Sight Illumination and Deflector Device addresses the need to improve safety for these terrains. Traditionally, areas without power are left to using common reflectors on guard rails, to placing multiple reflective signage that only reflects the light source of the vehicle one is driving, or to providing power through batteries or small generators to warning devices. These are costly and take maintenance and oversight to keep them active and useful. Drivers and passengers of large and small vehicles such as automobiles, pick-ups, semi-tractors, snow plows, transportation and cargo trucks and busses and other similar vehicles may often be exposed to blind spots when using these unlit roadways. These persons need a better way to be aware of other vehicles, pedestrian, emergencies and locomotives in the area.

B. Prior Art:

As far as known, there are no Bi-directional Blind Sight Illumination and Deflector Device or the like. It is believed that this product is unique in its design and technologies. However, in prior art, disclosures have been made, many including complex devices and some for use in roadway surfaces and guardrails. A U.S. Reissued Patent RE 982 issued in 1860 to Wyberd shows a reflective top assembly placed over a gaslight. Here the use of the gas as energy was employed. The new Bi-directional Blind Sight Illumination and Deflector Device uses no energy and reflects and disperses light from another light source such as a car, truck or flashlight. Another U.S. Pat. No. 1,655,891 for a combination day and night reflector on signs was issued in 1928 to Boots et al. It demonstrated reflective devices but no dispersion or augmentation to the light source.

In 1939 another concept was awarded a U.S. Pat. No. 2,142,803 that was issued to Robertson. This employed a road reflector placed directly into the surface of the roadway. The invention showed no improvement for alerting the drivers to oncoming traffic at hills and curves or near dense vegetation as the Allen device demonstrates. In 1976 a safety reflector device earned a U.S. Pat. No. 3,963,307 for Kirk. This shows a safety signal device for bicycles and the like that includes a shield member which is mounted on an elongate support member and provides a flag type safety warning, visible over hills or the like, of an approaching vehicle. While employing an elongated pole, there is no suggestion or motivation to place the device in a stationary, fixed location to warn vehicles of other vehicles and pedestrians as the Allen Bi-directional Blind Sight Illumination and Deflector Device. It is inconsistent and unobvious that the portable use with a bicycle would be employed in multiple locations as fixed warning devices.

Nearer in scope of use, a U.S. Pat. No. 4,000,882 was issued in 1977 to Penton. This was for a contrasting marker panel for highway guardrails and the like. The device describes an invention that relates to a construction of a contrasting marker panel for highway guardrails and a method of forming the same. More particularly, this invention relates to a marker panel which may have certain contrasting surface portions in the form of colors and/or reflectorized surface portions that are provided on the marker panel which are exposed outwardly of the guardrail recess to thereby form a contrasting indication visible against highway surrounding background to vehicles traveling the adjacent highway. While an improved device, it uses the costly guardrail as opposed to the simple sheet on an elongated pole as shown by the Allen device. This puts the safety device as a much more costly device for the object itself and the installation. Further, it does not improve the danger indication for hills and high vegetation areas where the low guardrail may be un-seen. Recently, in 2001 a U.S. Pat. No. 6,168,276 was issued to Weid for a road safety reflector. Here the road safety reflector assembly has a pair of oppositely disposed finger cradles with a hollow, re-enforceable housing, which has one or two reflectors mounted therein. Reflecting road markers augment the stripes in the road. The reflecting road markers can be colored to indicate the kind of stripes being used on the road. This type of safety mechanism employed a road reflector device placed directly into the surface of the roadway. The invention showed no improvement for alerting the drivers to oncoming traffic at hills and curves or near dense vegetation as the Allen device demonstrates.

More recently, a guardrail reflector and delineator and mounting device was shown in U.S. Pat. No. 7,300,165 issued to Garcia in 2007. Here is provided reflective markers, reflectors, and delineators with a variety of mounting apparatuses for attaching them onto standard guardrails without affecting the safety feature, display utility, and visibility of the marker/reflectors/delineators mounted onto the railing. The guardrail reflector/delineator boasts that it is particularly useful in locations and places with limited or no lighting, for example, cloudy days, foggy areas, dark places, streets with no lights at night, etc. However, it does no reflection and dispersion for hills, mountains or in high vegetation situation. Plus, it requires the use with the more expensive guardrail with a means to mount upon the rails surface. Finally, as prior art a U.S. Patent application was published in 2006 as US Publication 2006/0162644 for Choi that described a light reflector of a guardrail. It described another type of A light reflector (delineator) of a guardrail for a road having a mirror like light reflecting surface formed on a reverse trapezoidal valley of a light reflecting body, and front and rear ends of the reverse trapezoidal valley attached with a high brightness light reflecting tape or coated with a fluorescent paint. Again the this device requires the use with the more expensive guardrail with a means to mount upon the rails surface. Again it provides no light reflection and dispersion for hills, mountains or in high vegetation situation.

SUMMARY OF THE INVENTION

This invention is a Bi-directional Blind Sight Illumination and Deflector Device. What is taught here are the ways a reflective, dispersive, and transmitting lens may be placed on a support means such as a pole. One or more of the lens is/are placed individually along roadways and provide attention/warning points to be located at curves, hills and other potentially dangerous points. Vehicle headlights or flashing emergency lights are then transmitted to the device, are intensified and then become the warning point for the motorist.

The preferred embodiment of the Bi-directional Blind Sight Illumination and Deflector Device is comprised of the reflective, translucent and dispersive transmitting lens and a support means whereby one or more of the devices are placed at critical positions where warning points are important for safe vehicle operation. This may be for example, and not as a limitation, a plastic lens with the refracting projections (multiple pyramids, hemispheres and the like) such as a lens cover for a simple fluorescent light. The lens is supported by a support means such as a pole and lens frame. The lens may be plastic, a glass like composite or other translucent and reflective material. The poles and frames may be of metal, plastic, wood or composite materials.

The newly invented "Bi-directional Blind Sight Illumination and Deflector Device" may be manufactured at low volumes by very simple means and in high volume production by more complex and controlled systems.

OBJECTS AND ADVANTAGES

There are several objects and advantages of the Bi-directional Blind Sight Illumination and Deflector Device. There are currently no known reflection systems for transportation warnings/alerts that are effective at providing the objects of this invention.

In the transportation field if a vehicle is traveling upon a small hill/blind spot with bright lights and comes to the crest of the hill and then only to notices a vehicle traveling in the opposite direction coming toward them the blind sight gives early warning. The Blind sight can give a warning to the on-coming motorist (1) a vehicle is about to crest the hill and (2) to dim one's bright lights.

When driving on a darken road/etc. one's eyes are adjusted to the dark so when bright lights from an oncoming vehicle shines their bright lights at close range the eyes cannot adjust quickly enough to be able to see the road/etc. If the oncoming car wasn't noticed at all by a driver one or both of the drivers may be startled, causing a temporary loss of control. The Blind sight can give a warning to the on-coming motorist.

Blind curves will work generally the same way as above paragraph. The Blind sight can give a warning to the on-coming motorist.

If a vehicle is stopped just around/over a blind spot in the road with its red and blue emergency flashers on, bright red flares out, yellow turn signal on, etc. then the Blind sight with give on coming motorist a warning that something is around/over in the blind spot. All colors will show in the Blind Sight's screen on the other side away from the light source showing all colors and their intensities and will not wash all the different colors together creating different colors other than what is used. The more intense lights received on the backside screen will be the more intense light on the front side of the screen. The direction of the light source does not have to be pointed directly at the backside of the screen for the effect to show in the front side of the screen. Any light source that can be seen to the backside will show up on the front side screen.

People walking on the roads can see in the Blind sight that an oncoming vehicle is approaching around/over a blind spot and can get off the road and/or shine a flashlight at the Blind sight to warn the oncoming traffic.

If an emergency vehicle is on the other side of the blind spot with its lights and strobes on, this will produce flashing, (as it occurs from the emergency vehicle), in the Blind sight screen. The Blind Sight will pick up the light on the screen as soon as it receives it and drop the light from screen as soon as the light source is gone. This is why a strobe light source will appear as a strobe on the screen. If the front side of the screen of the Blind Sight was showing a weak light at first and the light is getting brighter, this is a good sign that the light source is getting closer to the backside of the screen.

In a factory use, most forklifts have a strobe/s flashing at all times, if an Blind sight was mounted on corners, ramps, etc. it could serve as a warning on the blind spots in the factory that a forklift/moving object/s is near. With reflective surfaces added to the Blind Sight it can be used in angled application such as unlit Rail Road Crossings, cross walks and etc.

Any lights can be used for the Blind sight to work—laser, strobes, car headlights, taillights, flashlights and flairs are examples and not limitation to the use of the device. Lasers seem to illuminate quite well from far off distances.

Finally, other advantages and additional features of the present Bi-directional Blind Sight Illumination and Deflector Device will be more apparent from the accompanying drawings and from the full description of the device. For one skilled in the art of reflective light devices and systems, it is readily understood that the features shown in the examples with this product are readily adapted to other types of reflective systems and devices.

DESCRIPTION OF THE DRAWINGS—FIGURES

The accompanying drawings, which are incorporated in and constitute a part of this specification, illustrate an embodiment of the Bi-directional Blind Sight Illumination and Deflector Device that is preferred. The drawings together with the summary description given above and a detailed description given below serve to explain the principles of the Bi-directional Blind Sight Illumination and Deflector Device. It is understood, however, that the Bi-directional Blind Sight Illumination and Deflector Device is not limited to only the precise arrangements and instrumentalities shown.

FIGS. 5A and B are sketches of an approaching car on a hill and the Bi-directional Blind Sight Illumination and Deflector Device.

FIG. 6A and FIG. 6B are sketches of a red laser illumination and a bright white light from a far distance. FIG. 6C is a sketch of a device with an angled light source.

Figure 7:
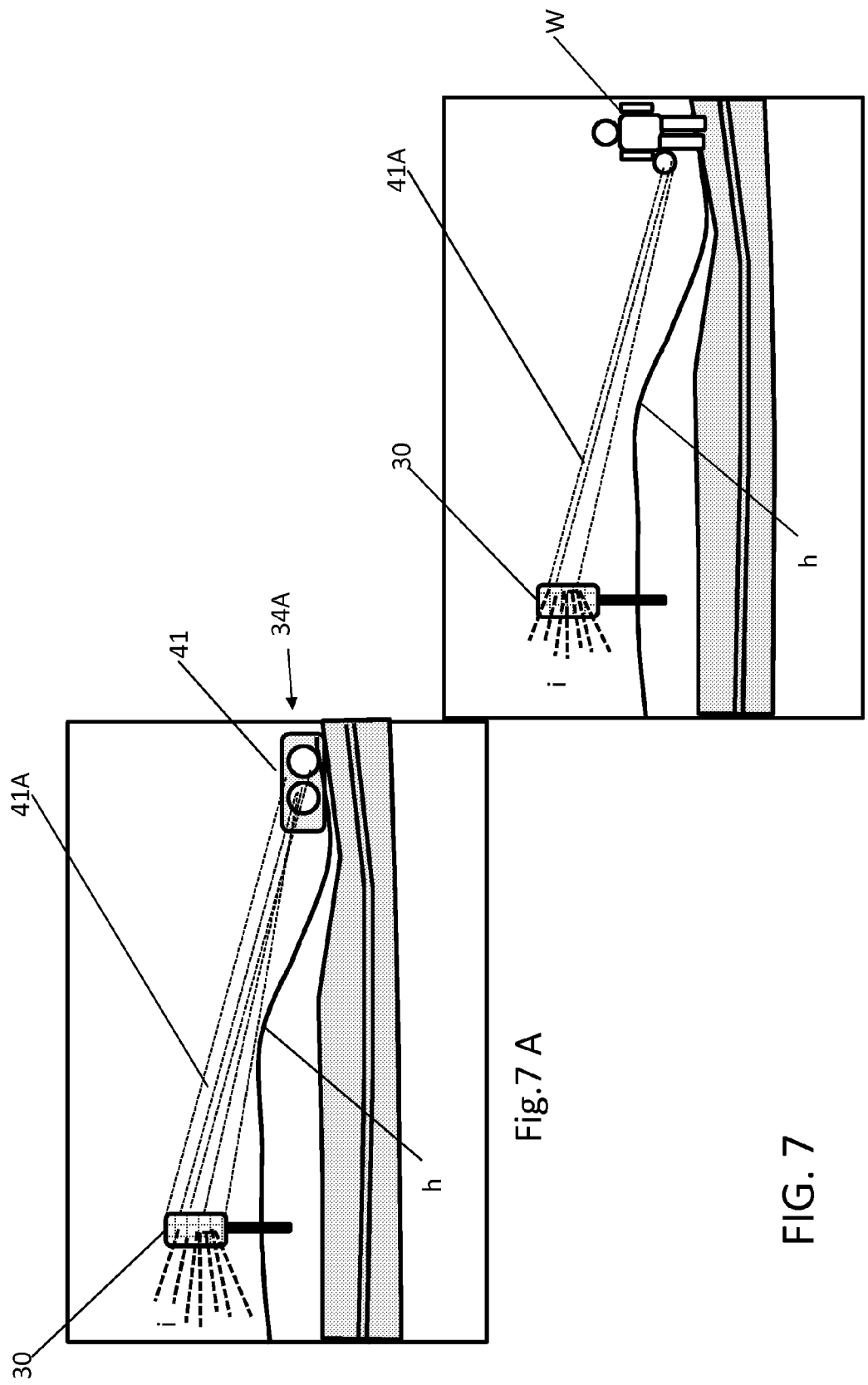

FIGS. 7A and 7B are additional sketches of an approaching car on a hill and a walker—both illuminating the Bi-directional Blind Sight Illumination and Deflector Device.

FIGS. 8A, 8B and 8C are vehicles (front, emergency and rear) and multiple Bi-directional Blind Sight Illumination and Deflector Devices.

FIGS. 9A and 9B are sketches of an emergency vehicle from the rear and walkers car on a hill and the Bi-directional Blind Sight Illumination and Deflector Device. FIG. 9C shows refletive surfaces added to the Blind Sight that can be used in angled applications.

DESCRIPTION OF THE DRAWINGS—REFERENCE NUMERALS

The following list refers to the drawings:

TABLE B

Reference numbers

| Ref # | Description |
|---|---|
| 30 | General Bi-directional Blind Sight Illumination and Deflector Device |
| 31 | Device in use |
| 32 | Support means |
| 33 | Frame for Bi-directional Blind Sight Illumination and Deflector Device |
| 34A | Vehicle A |
| 34B | Vehicle B |
| r | Radius |
| i | Illumination, dispersion at device |
| L | Line of sight |
| h | Hill |
| c | Curve |
| W | Walker with flashlight |
| L | Locomotive |
| 41 | Headlights |
| 41A | Headlight illumination |
| 42R | Red laser light illuminated |
| 43 | Bright light from a distance |
| 44 | Sign graphics or symbols |
| 45 | Special transmitting lens panel(s)-color, texture, surface finish, translucent with partial reflection/dispersion/transmission etc. |
| 50 | Light source from a walker W |
| 51 | Emergency vehicle lights |
| 52 | Tail lights of vehicle |

DETAILED DESCRIPTION OF PREFERRED EMBODIMENT

The present development is a Bi-directional Blind Sight Illumination and Deflector Device. Particularly this reflector product is related to a reflectors that reflect back some of the same light that been projected towards the reflector with more intensity cutting through the reflector so that light still being projected towards the reflector can been seen. All reflectors have a reflective surface in or behind a lens or a prism that deflects the light back towards the light source.

What is taught here are the ways a reflective, dispersive, transmitting lens may be placed on a support means such as a pole. One or more of the lens is/are placed individually along roadways and provide attention/warning points to be located at curves, hills and other potentially dangerous points. Vehicle headlights or flashing emergency lights are then transmitted to the device, are intensified and then become the warning point for the motorist.

The preferred embodiment of the Bi-directional Blind Sight Illumination and Deflector Device is comprised of the reflective, translucent and dispersive transmitting lens and a support means whereby one or more of the devices are placed at critical positions where warning points are important for safe vehicle operation. This may be for example, and not as a limitation, a plastic lens with the refracting projections (multiple pyramids, hemispheres and the like) such as a lens cover for a simple fluorescent light. The transmitting lens is supported by a support means such as a pole and lens frame. The lens may be plastic, a glass like composite or other translucent and reflective material. The lens anticipates a series of bumps and prism-like areas that reflect and disperse the light rays and spreads the light. One skilled in optics recalls Snell's Law of Optics determines the angularity as the light impacts and is "bent" during transmission. The illumination is easier to view. The poles and frames may be of metal, plastic, wood or composite materials.

There is shown in FIGS. 1-9 a complete description and operative embodiment of the Bi-directional Blind Sight Illumination and Deflector Device. In the drawings and illustrations, one notes well that the FIGS. 1-9 demonstrate the general configuration and use of this product. The various example uses are in the operation and use section, below.

The accompanying drawings, which are incorporated in and constitute a part of this specification, illustrate an embodiment of the Bi-directional Blind Sight Illumination and Deflector Device 30 that is preferred. The drawings together with the summary description given above and a detailed description given below serve to explain the principles of the Bi-directional Blind Sight Illumination and Deflector Device 30. It is understood, however, that the Bi-directional Blind Sight Illumination and Deflector Device 30 is not limited to only the precise arrangements and instrumentalities shown. Other examples of reflection and illumination devices and uses are still understood by one skilled in the art of illumination devices to be within the scope and spirit shown here.

FIG. 1A is a sketch of the general Bi-directional Blind Sight Illumination and Deflector Device 30 and FIG. 1B is an example sketch of the device 30 in use 31. These are general sketches to show the way the device is used in context with vehicles 34A and the warning device 30.

Figure 1:
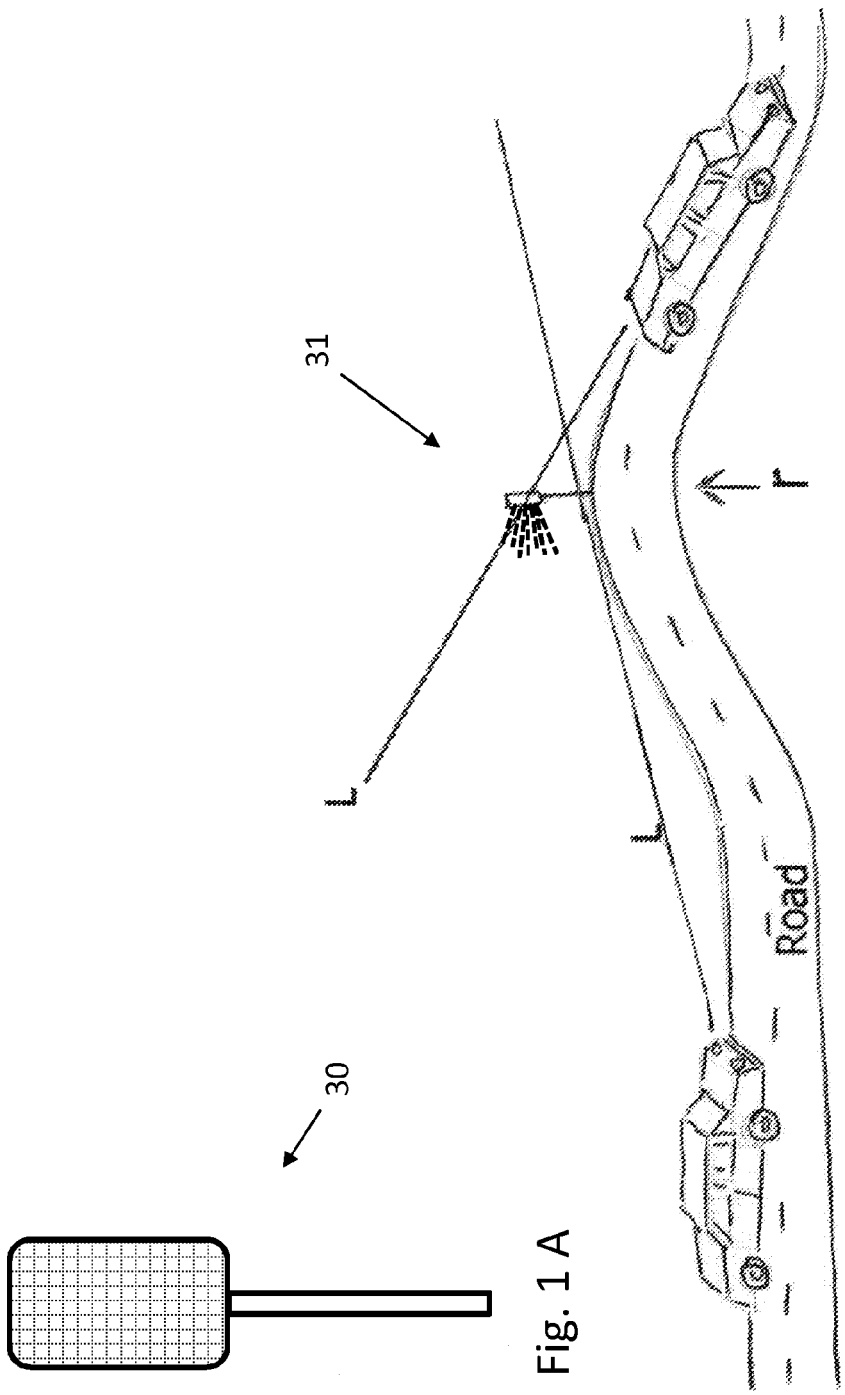
FIG. 1A is a sketch of the general Bi-directional Blind Sight Illumination and Deflector Device and FIG. 1B is an example sketch of the device in use.
Figure 2:
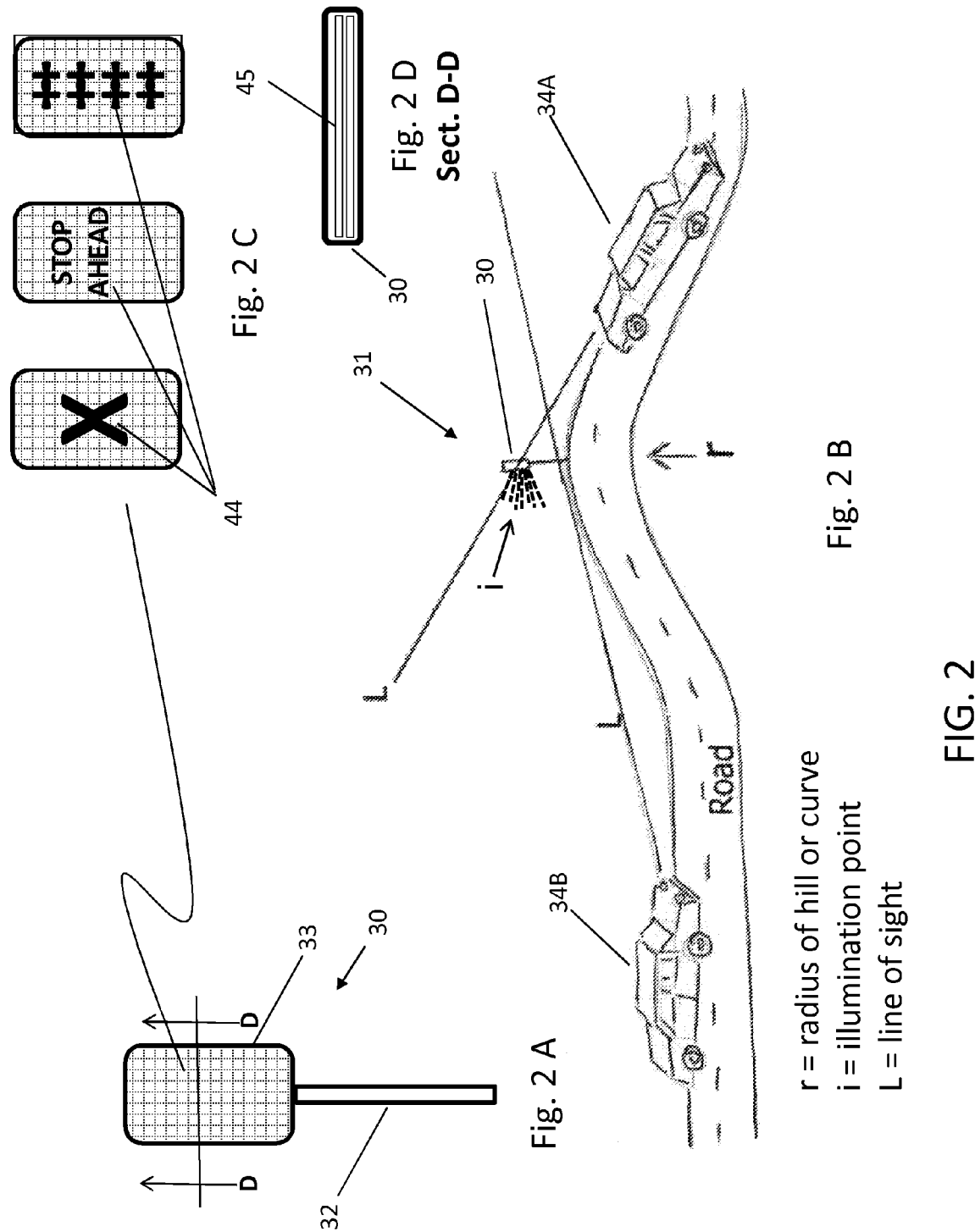
FIG. 2A is a sketch of the general Bi-directional Blind Sight Illumination and Deflector Device with components noted and FIG. 2B is an example sketch of the device in use with some of the features and important points noted.
FIGS. 2C and 2D are device details.

FIGS. 2 A is a of the general Bi-directional Blind Sight Illumination and Deflector Device 30 with components noted. Here is shown an optional frame 33. Also, the device has a means of support 32 such as a pole or equal. This pole 32 is removably or firmly secured directly to the transmitting lens 45 or the frame 33. As one skilled in sign and warning devices well knows, the means of support 32 may be of various cross sections for structural strength: such as a circular cross section; a rectangular and/or square tube; an oval; or an "I", "W", "L", "C", or "H" structural shape. In addition, the device 30 can be placed on a permanent fixture, an existing structure (such as a telephone pole) or a temporary structure for emergency or construction needs. These poles, existing structures and temporary structures are a means for supporting the frame in a viewable position.

The frame 33 may also be of various cross-sections with the most common being an "L" or "C". The means to attach the frame and lens to the pole may be by fasteners (bolts and nuts, rivets, and the like); metal clamps; wire; and/or connections by welding, adhesives and similar connection means. The transmitting lens 45 may be made of various materials, a plastic or composite being the preferred. That plastic may be of varied colors and may have a graphic letter, number or design on its surface or integral to the transmitting lens 45. It is anticipated that the transmitting lens 45 panel has bumps or protrusions out of one or both surfaces. Small pyramids or hemispherical protrusions in shape. Other shaped protrusions are anticipated and are in the scope of this invention device. FIG. 2B is an example sketch of the device in use 31 with some of the features and important points noted. The vehicles 34A and 34B are approaching a radius/curve r and are unable to observe each other's presence since each is out of the other's line of sight L. The Bi-directional Blind Sight Illumination and Deflector Device 30 is at the point of their common sight and is illuminated I by the vehicle headlights. FIGS. 2C and 2D are device 30 details.

The light can be amplified, changed in color, changed in direction, the different lights that could be applied to it (such as a supplementary lasers, vehicle headlights and/or taillights, flashlights, emergency flairs and so on. The graphic, alpha-numeric symbols 44 may be built integral to the transmitting lens 45 or surface mounted late to the device 30. These graphic indicators 44 may be a plethora of common symbols (such as letters, arrows, words, numbers, symbols and the like) or a unique information graphic for a specific area and a specific need - such as a "Deaf child" warning. Patterns can be added to device such as letters, arrows and alike. The light can be projected into device 30 with its own patterns created by the lenses such as "slow down", "stop" and alike projected from the front side or the backside of the device. The cross-section in FIG. D shows the potential presence of one or more lens to provide the sign's reflection as well as intensifying the light transmission. The colors, surface and materials for the transmitting lens 45 and device 30 are discussed above.

Figure 3:
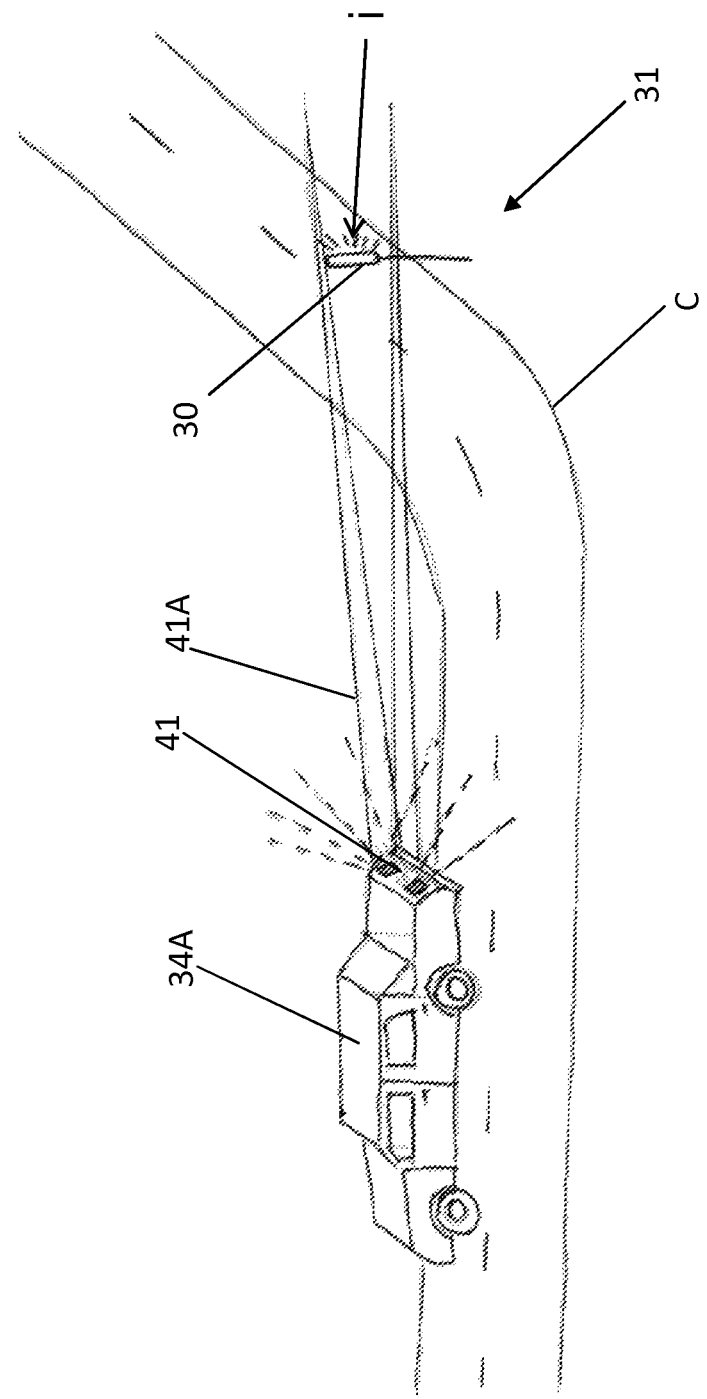
FIG. 3 is a sketch of a vehicle at a sharp curve.

FIG. 3 is a sketch of a vehicle 34A at a sharp curve C. The illumination 41A emanates from the headlights 41 of the vehicle 34A. Blind curves C will work generally if a vehicle 34A is traveling upon a small hill/blind spot with bright lights 41A and comes to the crest of the hill and then only to notices a vehicle traveling in the opposite direction coming toward them in the other lane cresting the hill at the same time. At this point the bright headlights 41 hits the oncoming vehicle and will cause an unexpected blindness and a small shock that can make drivers of either vehicle lose control temporary. The Blind sight device 30 can give a warning to the oncoming motorist (1) a vehicle is about to crest the hill and (2) to dim one's bright lights. One is well to remember that when driving on a darken road/etc. one's eyes are adjusted to the dark so when bright lights from an oncoming vehicle shines their bright lights at close range the eyes cannot adjust quickly enough to be able to see the road/etc. If the oncoming car wasn't noticed at all by a driver one or both of the drivers may be startled, causing a temporary loss of control.

Figure 4:
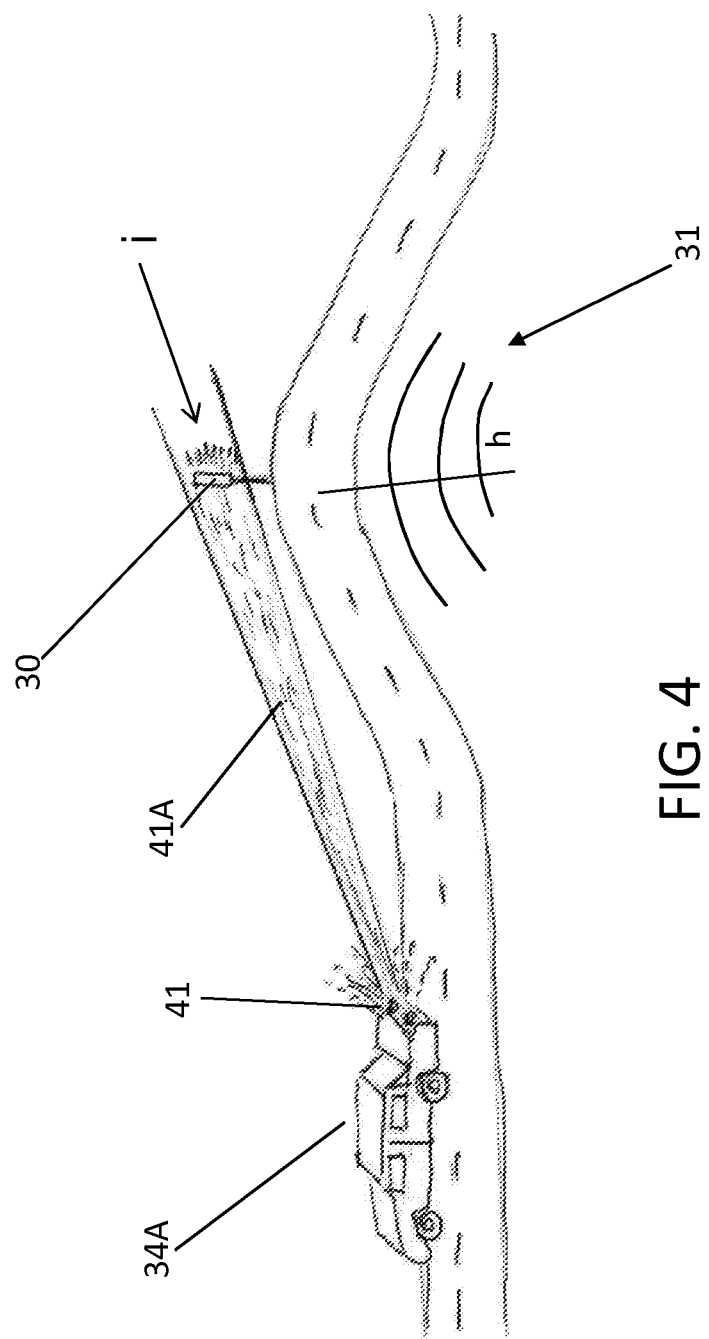
FIG. 4 is a sketch showing a vehicle at a hill or rise in the road.

FIG. 4 is a sketch showing a vehicle 34A at a hill h or rise in the road. The results and reactions are similar to that as described in the preceding paragraph.

FIG. 5 through FIG. 9 are sketches of uses and are described below.

The details mentioned here are exemplary and not limiting. Other specific components and manners specific to describing a Bi-directional Blind Sight Illumination and Deflector Device 30 may be added as a person having ordinary skill in the field of special illumination and reflective devices and their uses well appreciates.

Operation of the Preferred Embodiment

The Bi-directional Blind Sight Illumination and Deflector Device 30 has been described in the above embodiment. The manner of how the device operates is described below. One may note well that the description above and the operation described here must be taken together to fully illustrate the concept of the Bi-directional Blind Sight Illumination and Deflector Device 30. The preferred embodiment of the Bi-directional Blind Sight Illumination and Deflector Device is comprised of the reflective, translucent and dispersive transmitting lens and a support means whereby one or more of the devices are placed at critical positions where warning points are important for safe vehicle operation. This may be for example, and not as a limitation, a plastic lens with the refracting projections (multiple protrusions like pyramids, hemispheres and the like) such as a lens cover for a simple fluorescent light. The transmitting lens is supported by a support means such as a pole and lens frame. The lens may be plastic, a glass like composite or other translucent and reflective material. The poles and frames may be of metal, plastic, wood or composite materials.

The Blind Sight works somewhat the same as the refracting reflector way but uses light from the backside. This means that light that comes from the backside of the reflector is concentrated and projected forwards instead of backwards returning toward the light source. All light hitting/impacting the front side does not reflect back, rather it is spread out and dispersed making it a larger source to be seen at night. This allows any light from the backside to be spread and dispersed and seen on the front of the reflector. The intensified light can be seen even if equal or greater light is being projected on the front side of the reflector simultaneously. The Blind Sight is bi-directional so any light will be intensified and seen on the other side. Any color with any light strength will work. This means that the Blind Sight screen/plane will not reflect any light back from the source so that a weaker light shining from the backside will be seen in the screen/plane on a percentage.

Many uses are anticipated for the Bi-directional Blind Sight Illumination and Deflector Device 30. The device 30 may be used in places such as roads, driveways, rail road crossings, factory aisles and so on. In these the devices may have other lenses added for different applications. Some examples, and not limitations, are shown in the following Table.

| ITEM | DESCRIPTION |
| --- | --- |
| 1 | Post reflector for hidden corners and high vegetation areas (trees and bushes) |
| 2 | Hill reflector |
| 3 | Curve reflector |
| 4 | Hill warning-oncoming traffic |

-continued

| ITEM | DESCRIPTION |
|---|---|
| 5 | Emergency vehicle warning |
| 6 | Approaching vehicle |
| 7 | Stalled vehicle |
| 8 | Pedestrian night warning/alert |
| 9 | Railroad crossing alert (FIG. 9C) |
| 10 | Factory and distribution center aisle ways |

If the light being shown on the Blind Sight is flashing then the light from the Blind Sight will be flashing as well with the same color too. Different colored or lenses or opaque inserts can be added to give such as an "X" projected to the illuminated side of the Blind Sight.

FIGS. 5A and B are sketches of an approaching car 34A on a hill h and the Bi-directional Blind Sight Illumination and Deflector Device 30. The illumination light 41A from the hidden vehicle 41 shines onto the Bi-directional Blind Sight Illumination and Deflector Device 30 and warns others of the vehicles presence and approach.

FIG. 6A and FIG. 6B are sketches of a red laser illumination 42 and a bright white light 43 from a far distance. This demonstrates the ability of various colored lights in use with the Bi-directional Blind Sight Illumination and Deflector Device 30 as well as the distances where oncoming vehicles may be tracked and their presence known. FIG. 6C is a sketch of a device with an angled light source. This shows how the light source is gathered and then displayed from a frontal surface. This is further exemplified in FIGS. 7 through 9.

FIGS. 7A and 7B are additional sketches of an approaching car 34A on a hill h and a walker with a flashlight W—both illuminating the Bi-directional Blind Sight Illumination and Deflector Device 30. Here an unseen light is rerouted or redirected into a device 30 that makes the unseen light visible.

FIGS. 8A, 8B and 8C are vehicles (front 41, emergency 51 and rear 52) and multiple Bi-directional Blind Sight Illumination and Deflector Devices.

FIGS. 9A and 9B are sketches of an emergency vehicle 51 from the rear and walkers 50 on a hill and the Bi-directional Blind Sight Illumination and Deflector Device 30. FIG. 9C shows reflective surfaces added to the Blind Sight that can be used in angled applications such as unlit Rail Road Crossings for locomotives L, cross walks and etc.

With this description it is to be understood that the Bi-directional Blind Sight Illumination and Deflector Device 30 is not to be limited to only the disclosed embodiment of product. The features of the Bi-directional Blind Sight Illumination and Deflector Device 30 are intended to cover various modifications and equivalent arrangements included within the spirit and scope of the description.

What is claimed is:

1. A bi-directional blind sight illumination and deflector device comprised of
    (a) at least one reflective, translucent and dispersive transmitting lens having a front and a rear surface and side edges;
    (b) a frame that encircles the transmitting lens;
    (c) a structural pole made of a durable material for affixing and placing the transmitting lens and frame to the ground; and
    (d) a means for securing the frame of the transmitting lens to the pole
wherein the bi-directional blind sight illumination and deflector device is used to warn and alert other vehicles of oncoming vehicles, emergency situations, stopped vehicles and pedestrian on a hill or curve where line of sight is inhibited.

2. The device according to claim 1 wherein the transmitting lens may be of a plastic material with refracting and dispersing features.

3. The device according to claim 2 wherein the refracting and dispersing features are multiple hemispherical protrusions.

4. The device according to claim 2 wherein the refracting and dispersing features are multiple pyramidal shaped protrusions.

5. The device according to claim 1 wherein the means for securing the frame of the transmitting lens to the pole is a fastener.

6. The device according to claim 5 wherein the fastener is a set of nuts and bolts.

7. The device according to claim 5 wherein the fastener is a rivet.

8. The device according to claim 1 wherein the means for securing the frame of the transmitting lens to the pole is at least one clamp.

9. The device according to claim 1 wherein the means for securing the frame of the transmitting lens to the pole is a wire mechanism.

10. The device according to claim 1 wherein the means for securing the frame of the transmitting lens to the pole is application of an adhesive.

11. The device according to claim 1 wherein the means for securing the frame of the transmitting lens to the pole is by placing a weld.

12. The device according to claim 1 wherein a structural cross section of the structural pole is selected from the group consisting of circular; rectangular;
    square; ovular; "I", "W", "L", "C", and "H" structural shapes.

13. The device according to claim 1 wherein a structural cross section of the frame is selected from the group consisting of "L" and "C" structural shapes.

14. The device according to claim 1 wherein the transmitting lens is comprised of a feature that is selected from the group consisting of letters, arrows, words, numbers, and symbols.

15. A bi-directional blind sight illumination and deflector device comprised of
    (a) at least one reflective, translucent and dispersive transmitting lens made of plastic and having side edges and a front and a rear surface with pyramidal protrusions;
    (b) a frame that encircles the transmitting lens;
    (c) a circularly structured metal pole for affixing and placing the transmitting lens and frame to the ground; and
    (d) a means for securing the frame of the transmitting lens to the pole
wherein the bi-directional blind sight illumination and deflector device is used to warn and alert other vehicles of oncoming vehicles, emergency situations, stopped vehicles and pedestrian on a hill or curve where line of sight is inhibited.

16. A bi-directional blind sight illumination and deflector device comprised of
    (a) at least one reflective, translucent and dispersive transmitting lens having a front and a rear surface and side edges;
    (b) a frame that encircles the transmitting lens;
    (c) a means for supporting the frame in a viewable position; and
    (d) a means for securing the frame of the transmitting lens to the means for supporting
wherein the bi-directional blind sight illumination and deflector device is used to warn and alert other vehicles of oncoming vehicles, emergency situations, stopped vehicles and pedestrian on a hill or curve where line of sight is inhibited.

* * * * *